Sept. 9, 1958 R. ADLER 2,851,523

TELEVISION RECEIVER SYNCHRONIZING SYSTEM

Filed Feb. 15, 1954 2 Sheets-Sheet 1

ROBERT ADLER
*INVENTOR.*

BY Francis W. Crotty

HIS ATTORNEY.

TELEVISION RECEIVER SYNCHRONIZING SYSTEM

Filed Feb. 15, 1954

2 Sheets-Sheet 2

ROBERT ADLER
*INVENTOR.*

BY Francis W. Crotty

HIS ATTORNEY.

United States Patent Office 2,851,523
Patented Sept. 9, 1958

2,851,523

TELEVISION RECEIVER SYNCHRONIZING SYSTEM

Robert Adler, Northfield, Ill., assignor to Zenith Radio Corporation, a corporation of Delaware Application February 15, 1954, Serial No. 410,319

4 Claims. (Cl. 178—7.3)

Figure 1:
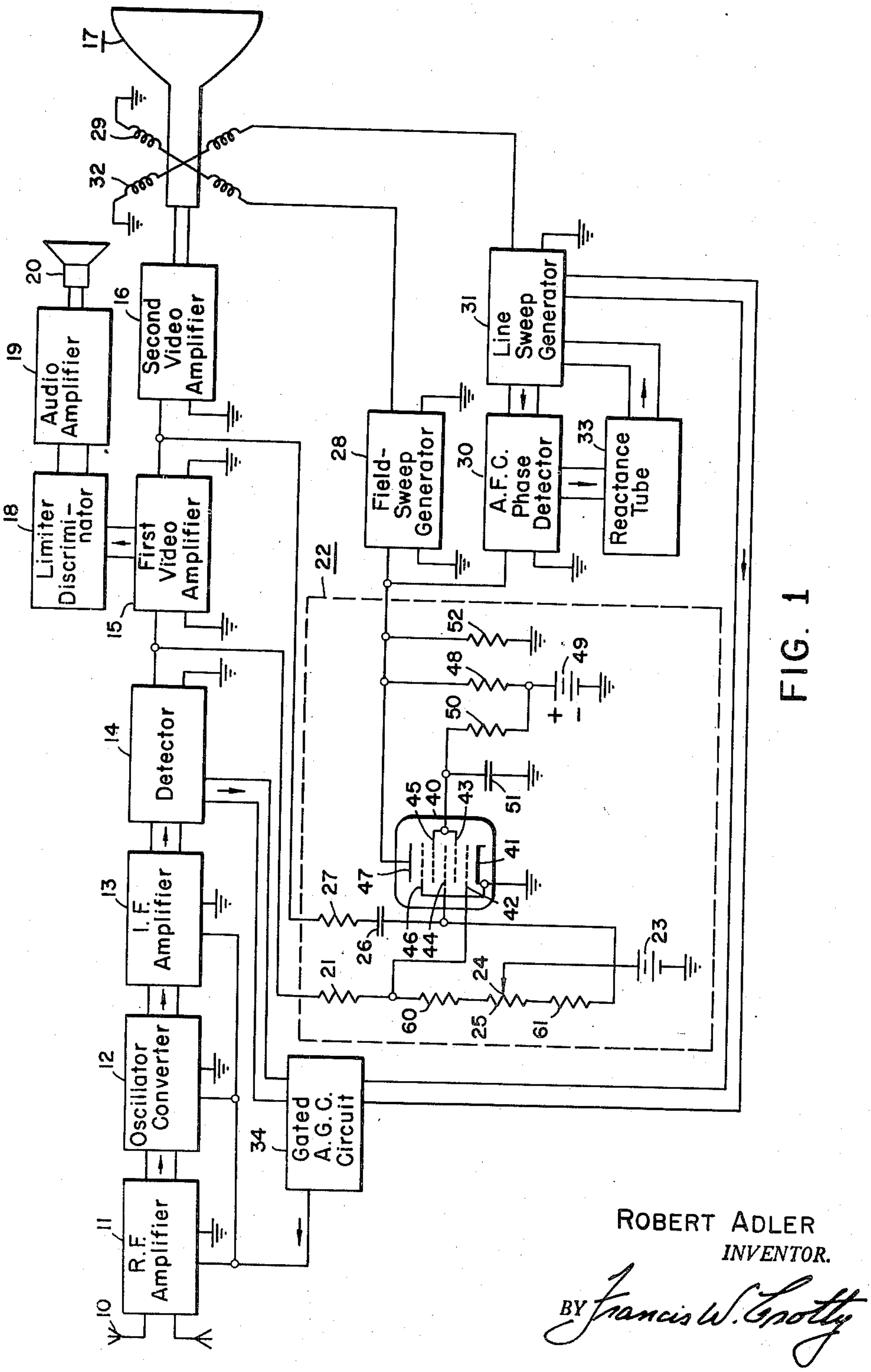

This invention relates to television synchronizing systems and more particularly to systems providing improved noise-immune synchronizing-signal separation during the reception of extremely weak signals.

The copending application of Robert Adler et al., Serial No. 230,472, filed June 8, 1951, now Patent Number 2,814,671, granted Nov. 26, 1957, and entitled Noise Pulse Interruption of Synchronizing Signal Separator and assigned to the present assignee, discloses and claims an improved synchronizing-signal separating circuit which is substantially noise-immune even in the so-called "fringe areas" where signal reception had previously been extremely poor or even unintelligible.

In the reception of television signals, concurrently translated noise pulses may mask the synchronizing pulses which are of greater amplitude than the video intelligence portion of the composite television signal. A preferred embodiment of the invention described and claimed in the aforesaid copending application comprises a noise-immune synchronizing-signal separator in which a negative-polarity composite video signal is inverted and applied with positive polarity to a self-biasing input circuit coupled to a control grid of a multi-electrode electron-discharge device. Simultaneously, the original negative-polarity composite video signal is direct-coupled to a different control grid of the same electron-discharge device and acts in conjunction with an operating characteristic of that device to prevent or at least inhibit the flow of space current through the device during the reception of noise pulses of an amplitude greater than that of the synchronizing pulses. In this way the synchronizing pulses which are utilized in a later stage to control the operation of the line-frequency and field-frequency sweep generators are kept substantially free from false synchronizing information corresponding to extraneous noise signals.

While the invention of the copending application gives excellent results and constitutes a substantial improvement over previously known synchronizing-signal separating systems, it has been found that in extremely weak signal reception areas, usually those at a relatively great distance from the transmitter, the amount of noise present in the signal is of such magnitude in comparison with the synchronizing pulses that even this improved synchronizing system experiences difficulty in discriminating between desired synchronizing pulses and extraneous noise pulses. This difficulty is manifest particularly in a complete loss of synchronization when interference originating outside the receiver, such as spark discharge from external electrical apparatus or thermal noise generated within the various electron-discharge devices of the television receiver, is superimposed upon extremely weak signals.

It is, therefore, an object of the present invention to provide a new and improved noise suppression system particularly useful in improving the synchronization of a television receiver during the reception of weak signals.

It is a further object of the invention to provide a synchronizing system which, while constituting a definite improvement over previously known synchronizing systems, accomplishes this aim through a simple and economical circuit arrangement.

In accordance with the invention, an improved television receiver comprises a source of composite video signals of one polarity and phase-inverting means coupled to this source for developing video signals of the opposite polarity. An electron-discharge device comprising an electron emissive cathode, an output electrode, and a pair of control grids is also provided. A first network couples the source of composite video signals to one of the control grids of the electron-discharge device and to its cathode and includes means for establishing a predetermined positive bias potential on that control grid with respect to the cathode. A second network coupling the phase-inverting means to the other control grid and to the cathode includes means for establishing a predetermined negative bias potential on the other control grid with respect to the cathode. In addition, means common to both networks are also provided for simultaneously varying the previously recited predetermined bias potentials in inverse senses to determine the noise rejection characteristics of the television receiver.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements and in which:

Figure 1 is a schematic diagram partially in block form of a television receiver embodying the present invention; and Figures 2–5 are idealized graphical representations of operating characteristics useful in explaining the operation of the receiver of Figure 1.

Throughout the specification and claims the term "composite video signal" is employed to describe the demodulated received radio-frequency television signal. The polarity of the composite video signal is determined by referring the synchronizing pulse components to the video signal components; thus "positive-polarity" refers to a composite video signal in which the synchronizing-signal pulses are positively oriented with respect to the video intelligence signals, and "negative-polarity" composite video signals are signals which are out of phase by 180 electrical degrees with respect to the positive-polarity composite video signals. The polarity of the composite video signal applied to the input circuit associated with a control grid is reckoned from the control grid to the cathode; for this purpose, the polarity is determined by considering the signal potential at the control grid with respect to cathode potential as a reference, regardless of whether grid feed or cathode feed is employed.

In the television receiver of Figure 1, received radio-frequency television signals comprising a radio-frequency carrier-wave modulated with composite video signals are intercepted by an antenna 10. The received signals are selected and amplified in a radio-frequency amplifier 11, and heterodyned in an oscillator-converter 12 wherein the carrier frequency is reduced to an intermediate frequency. The output signal of oscillator-converter 12 is amplified in an intermediate-frequency amplifier 13 of any desired number of stages and applied to a video detector 14 where it is demodulated and from which a composite video signal of negative-polarity is applied to a first video amplifier 15 which operates as a phase-inverting means as well as video-signal amplifier. The composite video signal is further amplified in a second video amplifier 16 and then applied to the control grid (not shown) of an image-reproducing device 17 to modulate the intensity of an electron stream in accordance with the video-signal information. Intercarrier sound signals from first video amplifier 15 are applied to an audio reproducing system comprising a limiter-discriminator 18 and an audio amplifier 19. The output of audio amplifier 19 is applied to a sound-reproducing device 20 which may be a loudspeaker of any conventional design.

Detector 14 and first video amplifier 15 are separately coupled to different input circuits of a synchronizing-signal separator 22 (hereinafter to be described in greater detail). The output of synchronizing-signal separator 22 comprises both field-frequency and line-frequency synchronizing pulses. The field-frequency synchronizing pulses are applied to a field-frequency sweep generator 28 to control the deflection current in a vertical sweep coil 29 associated with image-reproducing device 17. Horizontal-synchronizing pulses from the output of synchronizing-signal separator 22 are applied to a phase detector 30 for phase comparison with a locally generated signal from a line-frequency sweep generator 31 to develop a unidirectional control signal to a reactance tube 33. Reactance tube 33 controls the operating frequency of line-frequency sweep generator 31 which applies appropriate line-frequency sweep current to a horizontal deflection coil 32 associated with image-reproducing device 17. The line-frequency sweep current applied to coil 32 acts in conjunction with the field-frequency current applied to vertical-deflection coil 29 to produce a two-dimensional representation or raster upon the viewing surface of image-reproducing device 17.

A gating signal from line-frequency sweep generator 31 is supplied to a gated automatic gain control (AGC) circuit 34 which is supplied with composite video signals from video detector 14 and develops a unidirectional control signal proportional to the amplitude of the synchronizing components of the received composite video signals. This control signal is applied to radio-frequency amplifier 11, oscillator-converter 12, and IF amplifier 13 to vary the gain of these stages in inverse proportion to the strength of the received signals in a manner well known in the art.

With the exception of synchronizing-signal separator 22, the construction and operation of the illustrated television receiver may be entirely conventional. The particular intercarrier sound system, and the line-frequency sweep circuit including AFC phase detector 30 and reactance tube 33, may be replaced by other conventional circuitry if desired. The AGC system 34 need not be of the gated signal type but may take any convenient form for controlling the gain of the early stages of the receiver to prevent overloading during the reception of strong signals.

Synchronizing-signal separator 22 comprises a multi-electrode electron-discharge device 40 which may be of the gated-beam type (6BN6) but is preferably of the pentagrid type (6BE6 or 6CS6) having in the order named a cathode 41, a first control grid 42, a first accelerating electrode or screen grid 43, a second control grid 44, a second accelerating electrode 45, a suppressor grid 46, and an output electrode or anode 47. Cathode 41 and suppressor grid 46 are connected directly to a reference potential such as ground. Control electrode 42 is connected to the output of video detector 14 through a first network comprising a grid current limiting resistor 21 and to a source of unidirectional positive potential 23 through a buffer resistor 60 and a tap 24 on a variable resistor 25. Positive potential source 23 may be any suitable positive bias source, such as a battery, or in practice may be the direct-voltage power supply source of the receiver. Second control electrode 44 is connected to first video amplifier 15 through a second network comprising a coupling condenser 26 and a series resistor 27 and to potential source 23 through a buffer resistor 61 and tap 24 on resistor 25. Buffer resistors 60 and 61 prevent tap 24 from connecting source 23 directly to either control grid 42 or 44 at its extreme positions. Output electrode 47 is connected through a load resistor 48 to a source of unidirectional positive potential such as a battery 49, and accelerating electrodes 43 and 45 are connected to potential source 49 through a dropping resistor 50 which is bypassed to ground by a condenser 51. Output electrode 47 is also connected to ground through a resistor 52, and the junction between resistors 48 and 52 is coupled to field-frequency sweep generator 28 as well as to phase detector 30.

In operation, positive-polarity composite video signals from first video amplifier 15 are applied to second control grid 44 of electron-discharge device 40 through the coupling network comprising resistor 27, condenser 26, and the lower portion of potentiometer 25. A positive bias potential is applied to control grid 44 from source 23 through tap 24 on variable resistor 25. Since second control grid 44 follows an accelerating electrode or screen grid 43, a virtual cathode is generated in its vicinity, and a step-function transfer characteristic is achieved. The step-function transfer characteristic may be described as a narrow region of high transconductance immediately preceded by a broad region of zero space current and immediately followed by a broad region of plate current saturation. Since positive-polarity composite video signals are applied to electrode 44, grid current is drawn during synchronizing pulse intervals. The discharge time constant of the network comprising condenser 26 and the lower portion of resistor 25 is made long with respect to the time interval between successive line-frequency synchronizing pulses, so that these elements function as a self-biasing input circuit. In other words, when tap 24 is properly set in relation to the strength of the received signal, as will be explained more particularly hereinafter, the portion of resistor 25 in the discharge path of condenser 26 and the operating bias of grid 44 have the appropriate values to provide sync clipping in the same manner as with conventional self-biased synchronizing-signal separators. Where the strength of the received signal is at least of average value, pure sync clipping is achieved since the video-intelligence portion of the television signal remains in the region of plate current cut-off of the transfer characteristic of grid 44 while the synchronizing pulses, being of greater peak amplitude than the video signal components, extend through the region of high transconductance into the region of plate current saturation. Consequently, synchronizing-pulse information alone appears in the output circuit of electron-discharge device 40. The synchronizing pulses appear across output load resistor 48 and are applied to field-frequency sweep generator 28 and to AFC phase detector 30 to control the respective field-frequency and line-frequency sweep systems.

In a conventional self-biased synchronizing-signal separator, noise pulses which, in the normal reception of television signals, often are of much greater amplitude than the synchronizing pulses are also transmitted to the output circuit and may interfere with the proper synchronization of the television receiver. Moreover, extraneous noise pulses may cause additional current flow in the self-biasing input grid circuit, resulting in the generation of excessive negative bias and "tearing out" or complete loss of synchronization for a time interval determined by the discharge time constant of the input circuit. To avoid these conditions, negative-polarity composite video signals which include the extraneous noise pulses are applied through a linear coupling network comprising resistor 21, tap 24, and the upper portion of variable resistor 25 to control grid 42 in accurate time coincidence with the positive-polarity signals applied to the self-biased input grid 44.

Control grid 42 is positively biased to an extent determined by the setting of tap 24 on resistor 25 and it draws grid current, limited because of resistor 21. The video intelligence components and the synchronizing-pulse components of the negative-polarity composite video signal applied to grid 42 are effectively compressed by grid current loading in the manner described in the above-identified Adler et al. application so that there is no material cancellation effected by the presence of identical, but opposite polarity signals, on grids 42 and 44. Extraneous noise pulses which are of greater amplitude than the peak amplitude of the synchronizing-pulse components, and which would impair the operation of the receiver if translated by tube 40, instantaneously drive control grid 42 beyond plate current cut-off. A linear coupling circuit is employed between the source of negative-polarity composite video signals and control grid 42 and care is taken to insure time coincidence between the opposite polarity signals applied to the two control grids of device 40. Consequently, the space-current flow to anode 47 is interrupted, or at least materially reduced, during the reception of such extraneous noise pulses, so that little or no false synchronizing information is translated to the output circuit. Moreover, the extraneous noise pulses appearing in the self-biasing input circuit for second control grid 44 are prevented from causing excessive charge-up of the input grid coupling condenser 26. Thus the adverse effects of extraneous noise on receiver synchronization are substantially reduced or eliminated.

Figure 2:
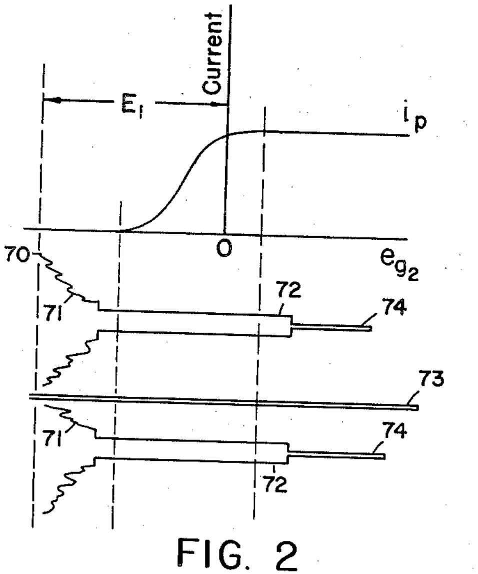
Figure 3:
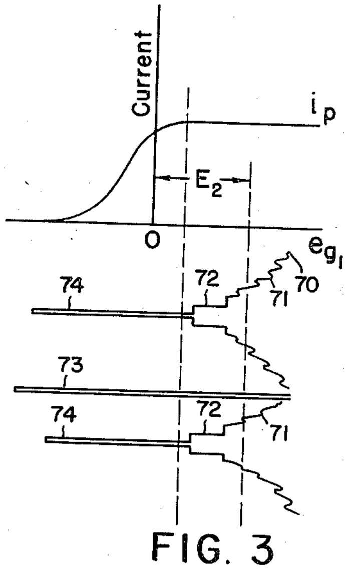

The operation of synchronizing-signal separator 22 under various conditions of signal strength and, more particularly, the effect of providing for simultaneous inverse variation of a resistor common to the grid coupling networks with a related variation of the bias voltages applied to control grids 42 and 44 in accordance with the present invention, may be more readily understood by reference to the graphical representations of Figures 2–5. Figures 2 and 3 are idealized graphical representations of the operating characteristics of device 40 for a strong signal area in which the amplitude of the synchronizing pulses of television signals is large.

Figure 2 illustrates, in particular, the operating characteristic of second control grid 44 with respect to output electrode 47 and shows the variation of anode current $i_p$ with respect to the voltage $e_{g2}$ applied to electrode 44, all other operating parameters being maintained constant. Negative bias $E_1$ on grid 44 establishes a composite video signal 70 comprising video intelligence portions 71 and synchronizing-signal pulses 72 on the proper portion of the operating characteristic of discharge device 40 so that the video intelligence portion of the signal remains in the region of plate current cut-off while synchronizing-signal pulses 72, extend through the region of high transconductance into that of plate current saturation. The net amount of bias $E_1$ is determined by the charge on condenser 26 established by grid current drawn by electrode 44 principally during sync pulse intervals and by the positive bias applied to control grid 44 from source 23 through the tap 24 of variable resistor 25. In strong signal areas where the synchronizing pulses have a large amplitude, tap 24 is adjusted near the top of resistor 25 so that the self bias $E_1$ is large. This backs the video portion of the received signal comfortably away from the high transconductance portion of the transfer characteristic, as represented in Figure 2, and in view of the large sync amplitude there is assured clean sync clipping. Any noise pulses 73 occurring within the video portion of composite video signal 70 and at least equal in amplitude to the synchronizing pulses are clipped in the same manner as the synchronizing pulses since they also extend across the region of high transconductance. Similarly, noise pulses 74 which may be superimposed upon the synchronizing pulses 72 are clipped off and have no effect upon the output current of device 40 since such noise pulses are confined to the region of plate current saturation. Thus, neglecting for a moment the effect of applying negative-polarity composite video signals to control grid 42 from video detector 15, separator 22 responds to strong signal conditions to produce output pulses corresponding to the synchronizing and noise pulse components of composite video signal 70 which extend into the high-transconductance region of the $i_p-e_{g2}$ curve. As described, this condition is achieved in practical operation of the circuit when tap 24 is adjusted so that it is at or near the top of resistor 25 introducing a maximum amount of resistance in the discharge path of condenser 26.

In order to prevent noise pulses from appearing in the output circuit of device 40 and acting as false synchronizing pulses, negative-polarity composite video signals are applied to control grid 42 from video detector 15 in time coincidence with the positive-polarity signals applied to control grid 44. In Figure 3, the output current of discharge device 40 is illustrated as a function of the voltage $e_{g1}$ applied to control grid 42. The positive bias potential $E_2$ applied to control grid 42 with tap 24 at or near the top of resistor 25 positions the negative-polarity composite video signal 70, comprising video intelligence portion 71 and synchronizing pulse 72, in such relationship with the operating characteristic of device 40 that the tips of the synchronizing pulses fall well within the region of anode-current saturation of the $i_p-e_{g1}$ characteristic curve as indicated. Objectionable noise pulses 73 and 74 are so much greater in amplitude than the synchronizing pulses that they extend into the region of zero plate current and prevent space current flow through device 40 throughout their individual duration. Under these conditions, therefore, the clipping action which otherwise occurs in response to signal components which extend from the region of zero plate current flow to plate current saturation (characteristic $i_p-e_{g2}$ of Figure 2) no longer takes place and no output signals are produced corresponding to such extraneous noise pulses. On the other hand, since the synchronizing pulses and the video intelligence of composite video signal 80 are maintained in the region of plate current saturation they have no effect upon the space current flow through control grid 42. The action of control grid 42 not only prevents the translation of extraneous noise pulses by its action in cutting off the space current flow through device 40, but it also prevents charge-up of condenser 26 in response to extraneous noise pulses. As a result, therefore, the self-bias of grid 44 is independent of noise pulses, and "tearing out" or loss of synchronization is precluded. The operation of synchronizing-signal separator 22 for the reception of signals of strong intensity is identical to the function of the synchronizing-signal separator described in the above-identified Adler et al. application.

Figure 5:
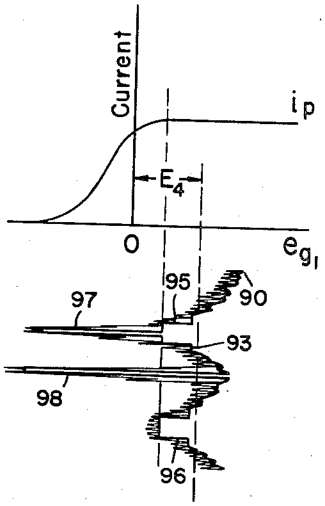

In fringe areas where the received television signal is relatively weak and extraneous noise pulses tend to obscure the video intelligence and to a greater extent the synchronizing pulse information, the noise immunity characteristics of the present circuit become of paramount importance. The bias voltage which is applied to control grid 42 under these conditions must be so adjusted that the tips of the synchronizing pulses 95—96 are at least at the knee of the $i_p-e_{g1}$ characteristic as illustrated in Figure 5 which is a representation of the output current of device 40 as a function of the signal voltage applied to grid 42. The bias of grid 42 is here designated $E_4$. Noise pulses 97 and 98 of a received television signal extend into the region of plate current cut off and, consequently, there can be no translation of such noise pulses to the output circuit of device 40; they cannot serve as false synchronizing information. In extremely noisy installations where there may also be noise pulses only slightly greater in amplitude than the desired synchronizing pulses, it is desirable further to decrease the value of bias $E_4$ to position the sync tips under the bend of the $i_p-e_{g1}$ curve so that noise pulses only slightly greater in amplitude than the synchronizing pulse tips drive tube 40 to anode current cut off, although, of course, there must be a suitable margin of safety to assure that synchronizing tips do not have the same effect. In order to establish potential $E_4$ at its proper value, tap 24 on resistor 25 must be moved toward its lowermost position thus deducing the amount of positive potential applied to grid 42 from battery 23.

Figure 4:
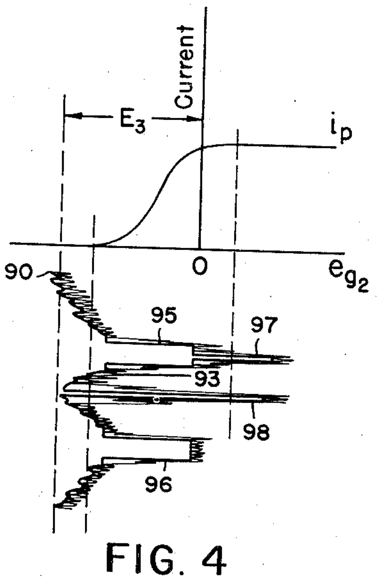

Simultaneously, the amount of resistance between grid 44 and the positive tap on battery 23 is reduced to decrease the resistance in the discharge path of condenser 26, decreasing its discharge time constant and the net negative bias $E_3$ developed on grid 44. Figure 4 illustrates the anode current flow of device 40 as a function of the applied signal to grid 44. This curve shows that the reduction in the negative bias on grid 44 may displace the composite video signal in relation to the $i_p - e_{g2}$ characteristic of device 40 so that in the presence of exceedingly weak signals a portion of the pedestal 93 of a synchronizing pulse 95 may be transmitted to the output of device 40 whereas otherwise synchronizing pulses only are translated through the clipping operation at grid 44 is described above. While the translation of the pedestal of a synchronizing pulse may result in shifting the video picture in a horizontal direction, it is quite apparent that even faulty synchronization is preferable to no synchronization whatever. In other words, the net bias $E_3$ of grid 44 during the reception of weak television signals in fringe areas represents a compromise between the loss of synchronizing pulses and the undesirable horizontal shifting of the television picture because of false synchronizing pulses resulting from translation of pedestal information as synchronizing information. This desirable compromise is achieved together with the required adjustment of the bias on grid 42 by means of a single control.

From the foregoing discussion, it is apparent that the portion of resistor 25 in the coupling networks to grids 42 and 44 as well as the component of positive bias applied to those grids for optimum operation of the separator vary in opposite senses with changes in signal strength. During the reception of strong signals, tap 24 is positioned near the top of resistor 25 which results in a high resistance in series with condenser 26 in the coupling circuit of grid 44 with relatively little resistance in the coupling circuit to grid 42. At the same time, the contribution of battery 23 to the bias of grid 44 is relatively low while its contribution to grid 42 is relatively high. On the other hand, during the reception of weak signals, tap 24 is adjusted toward the opposite end of resistor 25. The resistance in series with condenser 26 in the coupling network of grid 44 now has a much reduced value and the contribution of battery 23 to the bias of that grid is relatively high; both of these conditions are highly desirable for the reception of weak signals. At the same time the resistance in the coupling network to grid 42 has a maximum value and the bias established on this grid by battery 23 is relatively low; again both conditions are desirable for achieving optimum noise-immunization during the reception of weak signals.

In accordance with a feature of the present invention, the provision of potentiometer 25 connected between control grids 42 and 44 with variable tap 24 connected to positive potential source 23 permits simultaneous variations in the resistance and the bias voltages with respect to grids 42 and 44 in opposite senses with a single control element and has been found to permit rapid adjustment of the circuit for optimum noise-immunity.

This invention, therefore, provides a new and improved television receiver synchronizing system which provides improved noise-immunity, particularly in regions of weak-signal reception, and also inhibits the tearing out phenomenon at the top of the television picture during certain adverse transmission conditions. At the same time these advantages are achieved through a simple circuit rearrangement which is economical in cost and simple to adjust. With the described arrangement, it is no longer necessary to compromise upon a fixed value of resistance in the discharge circuit of coupling condenser 26, the practice that has previously been followed. It usually results in adopting a resistance value that is optimum for average signal strength but which gives less than optimum performance in strong and weak signal areas. With the improved circuit, the discharge resistor is established as to value in accordance with the need of the particular installation and concurrently the operating biases of the separator tube become adjusted for optimum synchronizing-signal clipping and noise-immunization.

While a particular embodiment of the invention has been shown and described, modifications may be made and it is intended in the appended claims to cover all such modifications as may fall within the true spirit and scope of the invention.

I claim:

1. In a television receiver: a source of composite video signals of one polarity; phase-inverting means coupled to said source for developing similar composite video signals of the opposite polarity; an electron-discharge device comprising an electron emissive cathode, an output electrode, and a pair of control grids; a first network coupling said source to one of said control grids and to said cathode and including means for establishing a positive bias potential of predetermined magnitude on said one control grid with respect to said cathode; a second network coupling said phase-inverting means to the other of said control grids and to said cathode and including means for establishing a negative bias potential of predetermined magnitude on said other control grid with respect to said cathode; and means at least partially common to said first and second networks for simultaneously varying said bias potentials in inverse senses to determine the noise rejection characteristics of said television receiver.

2. In a television receiver: a source of composite video signals of negative-polarity; phase-inverting means coupled to said source for developing similar composite video signals of positive polarity; an electron-discharge device comprising an electron emissive cathode, an output electrode, a first control grid, and a second control grid; a first network coupling said source to first control grid and to said cathode for applying said negative-polarity composite video signals between said first control grid and said cathode and including means for establishing a positive bias potential of predetermined magnitude on said first control grid with respect to said cathode; a second network coupling said phase-inverting means to said second control grid and to said cathode for applying said positive-polarity composite video signals between said second control grid and said cathode and including means for establishing a negative bias potential of predetermined magnitude on said second control grid with respect to said cathode; and means at least partially common to said first and second networks for simultaneously varying said bias potentials in inverse senses to determine the noise rejection characteristics of said television receiver.

3. In a television receiver: a source of composite video signals of one polarity; phase-inverting means coupled to said source for developing similar composite video signals of the opposite polarity; a synchronizing signal separating device including an electron-discharge device comprising an electron emissive cathode, an output electrode, and a pair of control grids; a first network coupling said source to one of said control grids and to said cathode and including means for establishing a positive bias potential of predetermined magnitude on said one control grid with respect to said cathode; a second network coupling said phase-inverting means to the other of said control grids and to said cathode and including means for establishing a negative bias potential of predetermined magnitude on said other control grid with respect to said cathode; and means at least partially common to said first and second networks for simultaneously varying said bias potentials in inverse senses to improve the synchronization of said television receiver during the reception of weak signals.

4. In a television receiver: a source of composite video signals of one polarity; phase-inverting means coupled to said source for developing similar composite video signals of the opposite polarity; an electron-discharge device comprising an electron emissive cathode, an output electrode, and a pair of control grids; a first network coupling said source to one of said control grids and to said cathode; a second network coupling said phase-inverting means to the other of said control grids and to said cathode and including self-biasing means comprising a capacitor connected at one end to said other control grid for establishing a negative bias on said other control grid; a source of unidirectional positive potential of predetermined magnitude; a two-terminal resistor D.-C. coupled between said control grids and having a variable tap intermediate its terminals D.-C. coupled to said positive potential source, thereby permitting concurrent inverse variation of the bias potentials on said control grids to improve the noise rejection characteristics of said television receiver.

References Cited in the file of this patent

UNITED STATES PATENTS

| | | |
|---|---|---|
| 2,088,231 | Cohn | July 27, 1937 |
| 2,358,325 | Fyler | Sept. 19, 1944 |
| 2,454,150 | Fredendall | Nov. 16, 1948 |

OTHER REFERENCES

Rider's Television Manual, vol. 10, Zenith Chassis 19K–20, Zenith TV, pages 10–28, copyrighted November 21, 1952.

Electronics, April 1952, pages 126 and 127.